(12) United States Patent
Otsuki et al.

(10) Patent No.: US 11,966,874 B2
(45) Date of Patent: Apr. 23, 2024

(54) LOGISTICS SYSTEM AND LOGISTICS ROBOT CONTROL METHOD

(71) Applicant: TOYOTA JIDOSHA KABUSHIKI KAISHA, Toyota (JP)

(72) Inventors: Nobuhisa Otsuki, Toyota (JP); Haeyeon Lee, Tokyo (JP); Kunihiro Iwamoto, Nagakute (JP); Kota Oishi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/742,471

(22) Filed: May 12, 2022

(65) Prior Publication Data

US 2022/0366356 A1 Nov. 17, 2022

(30) Foreign Application Priority Data

May 14, 2021 (JP) .................................. 2021-082693

(51) Int. Cl.
*G06Q 10/083* (2023.01)
(52) U.S. Cl.
CPC .................................. *G06Q 10/083* (2013.01)
(58) Field of Classification Search
CPC .................................................... G06Q 10/083
See application file for complete search history.

(56) References Cited

U.S. PATENT DOCUMENTS

| 2014/0046584 | A1* | 2/2014 | Aben | G01C 21/3461 |
| | | | | 701/428 |
| 2017/0160735 | A1* | 6/2017 | Mikan | G08G 1/20 |
| 2017/0176200 | A1* | 6/2017 | Jones | G01C 21/3697 |
| 2018/0130360 | A1* | 5/2018 | Sweet | G08G 5/0026 |
| 2018/0143639 | A1* | 5/2018 | Singhal | G08G 1/165 |
| 2018/0299290 | A1* | 10/2018 | Slavin | G08G 1/0145 |
| 2020/0072613 | A1* | 3/2020 | Kuzmanovic | G05D 1/102 |

(Continued)

FOREIGN PATENT DOCUMENTS

| JP | 6164599 B1 | 7/2017 |
| JP | 2018-101287 A | 6/2018 |
| WO | 2020/241002 A1 | 12/2020 |

OTHER PUBLICATIONS

Dearnaley, Mathew, "Minister raises hope for new harbour link," The New Zealand Herald, Auckland, New Zealand, Dec. 3, 2009, A1.*

(Continued)

*Primary Examiner* — Nathan Erb
(74) *Attorney, Agent, or Firm* — Sughrue Mion, PLLC

(57) ABSTRACT

A logistics system provides a logistics service utilizing a logistics robot that delivers a package by autonomous traveling. The logistics system includes one or more processors configured to execute a delivery route determination process that determines a delivery route along which the logistics robot delivers the package. When there are a plurality of delivery route candidates from a position of the logistics robot to a delivery destination of the package, the one or more processors select the delivery route from the plurality of delivery route candidates based on at least one of a congestion degree of each of the plurality of delivery route candidates, a time of day, a weather condition, and energy consumption of the logistics robot along each of the plurality of delivery route candidates.

10 Claims, 15 Drawing Sheets

(56) References Cited

U.S. PATENT DOCUMENTS

2021/0061278 A1\* 3/2021 Zhao ............... B60W 40/06
2021/0165931 A1\* 6/2021 Fuerst ............... G06F 30/20

OTHER PUBLICATIONS

PR Newswire, "Breakthrough New Lidar Technology Gives Argo AI the Edge in Autonomous Delivery and Ride-Hail Services: In-house developed sensor unlocks safe self-driving in cities, suburbs and on highways," New York, May 4, 2021.\*

\* cited by examiner

LOGISTICS SYSTEM AND LOGISTICS ROBOT CONTROL METHOD

CROSS-REFERENCE TO RELATED APPLICATION

This application claims priority to Japanese Patent Application No. 2021-082693 filed on May 14, 2021, the entire contents of which are incorporated by reference herein.

BACKGROUND

Technical Field

The present disclosure relates to a logistics service utilizing a logistics robot that delivers a package by autonomous traveling.

Background Art

Patent Literature 1 discloses a home delivery system utilizing a moving body that performs automated driving. The home delivery system identifies a home delivery locker corresponding to a delivery destination from among a plurality of home delivery lockers. The moving body performs the automated driving to deliver a package to the identified home delivery locker.

LIST OF RELATED ART

Patent Literature 1: Japanese Patent No. 6164599

SUMMARY

A logistics service utilizing a logistics robot that delivers a package by autonomous traveling is considered. A case where there are a plurality of candidates for a delivery route from a position of the logistics robot to a delivery destination of the package is conceivable. Patent Literature 1 does not consider a method of determining an appropriate delivery route in such the case. There is room for improvement in determining a delivery route.

An object of the present disclosure is to provide a technique that can determine an appropriate delivery route in a logistics service utilizing a logistics robot that delivers a package by autonomous traveling.

A first aspect is directed to a logistics system providing a logistics service utilizing a logistics robot that delivers a package by autonomous traveling.

The logistics system includes one or more processors configured to execute a delivery route determination process that determines a delivery route along which the logistics robot delivers the package.

When there are a plurality of delivery route candidates from a position of the logistics robot to a delivery destination of the package, the one or more processors select the delivery route from the plurality of delivery route candidates based on at least one of a congestion degree of each of the plurality of delivery route candidates, a time of day, a weather condition, and energy consumption of the logistics robot along each of the plurality of delivery route candidates.

A second aspect is directed to a logistics robot control method for controlling a logistics robot that delivers a package by autonomous traveling.

The logistics robot control method includes:

a delivery route determination process that determines a delivery route along which the logistics robot delivers the package; and a logistics robot control process that controls the logistics robot so as to deliver the package along the delivery route.

When there are a plurality of delivery route candidates from a position of the logistics robot to a delivery destination of the package, the delivery route determination process includes selecting the delivery route from the plurality of delivery route candidates based on at least one of a congestion degree of each of the plurality of delivery route candidates, a time of day, a weather condition, and energy consumption of the logistics robot along each of the plurality of delivery route candidates.

According to the present disclosure, when there are a plurality of delivery route candidates, the delivery route is selected based on at least one of the congestion degree of each delivery route candidate, the time of day, the weather condition, the energy consumption of the logistics robot on each delivery route candidate, and the delivery route history. It is thus possible to determine an appropriate delivery route according to a situation.

EMBODIMENTS

Embodiments of the present disclosure will be described with reference to the accompanying drawings.

1. Logistics System

Figure 1:
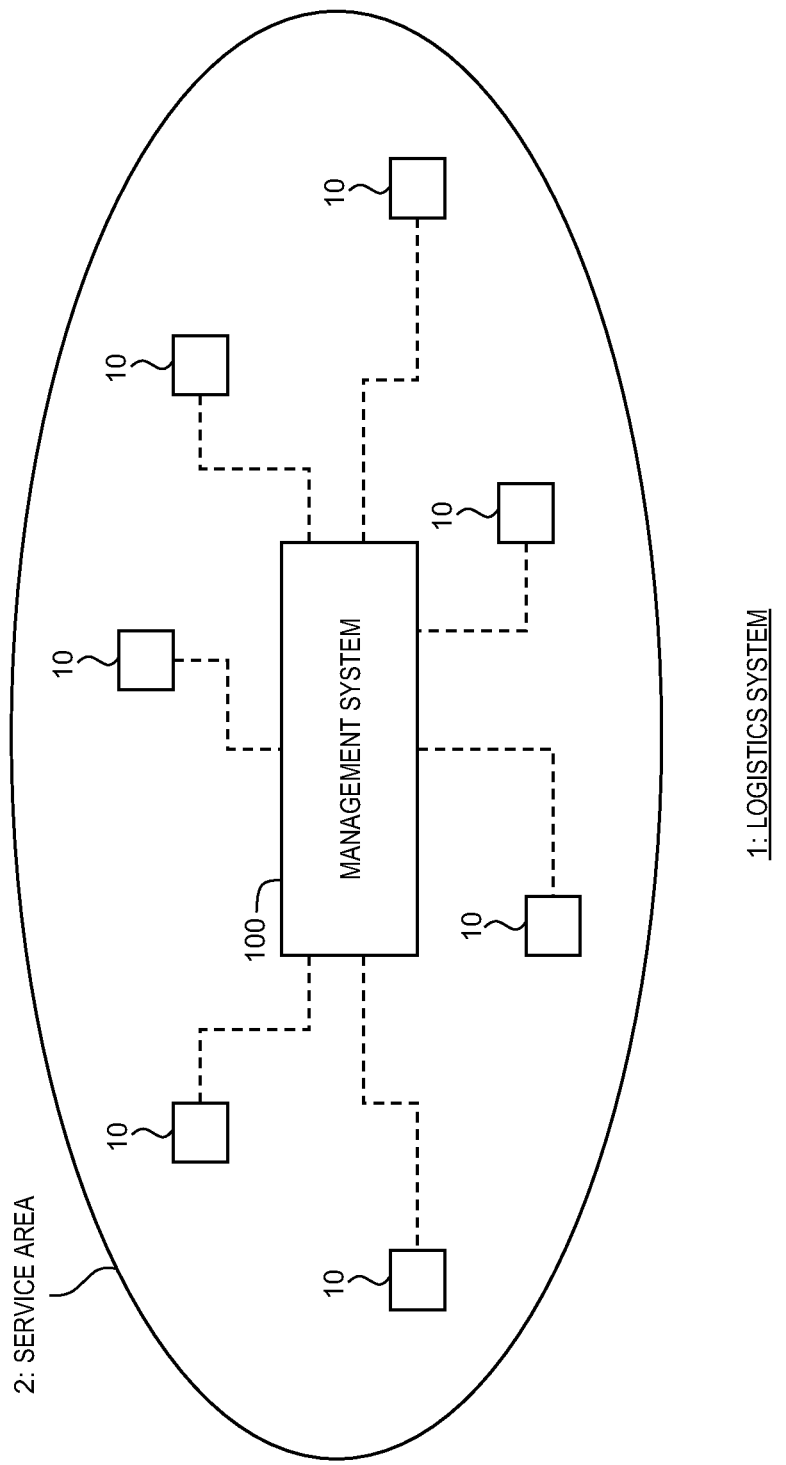
FIG. 1 is a conceptual diagram for explaining a logistics system according to an embodiment of the present disclosure.
Figure 2:
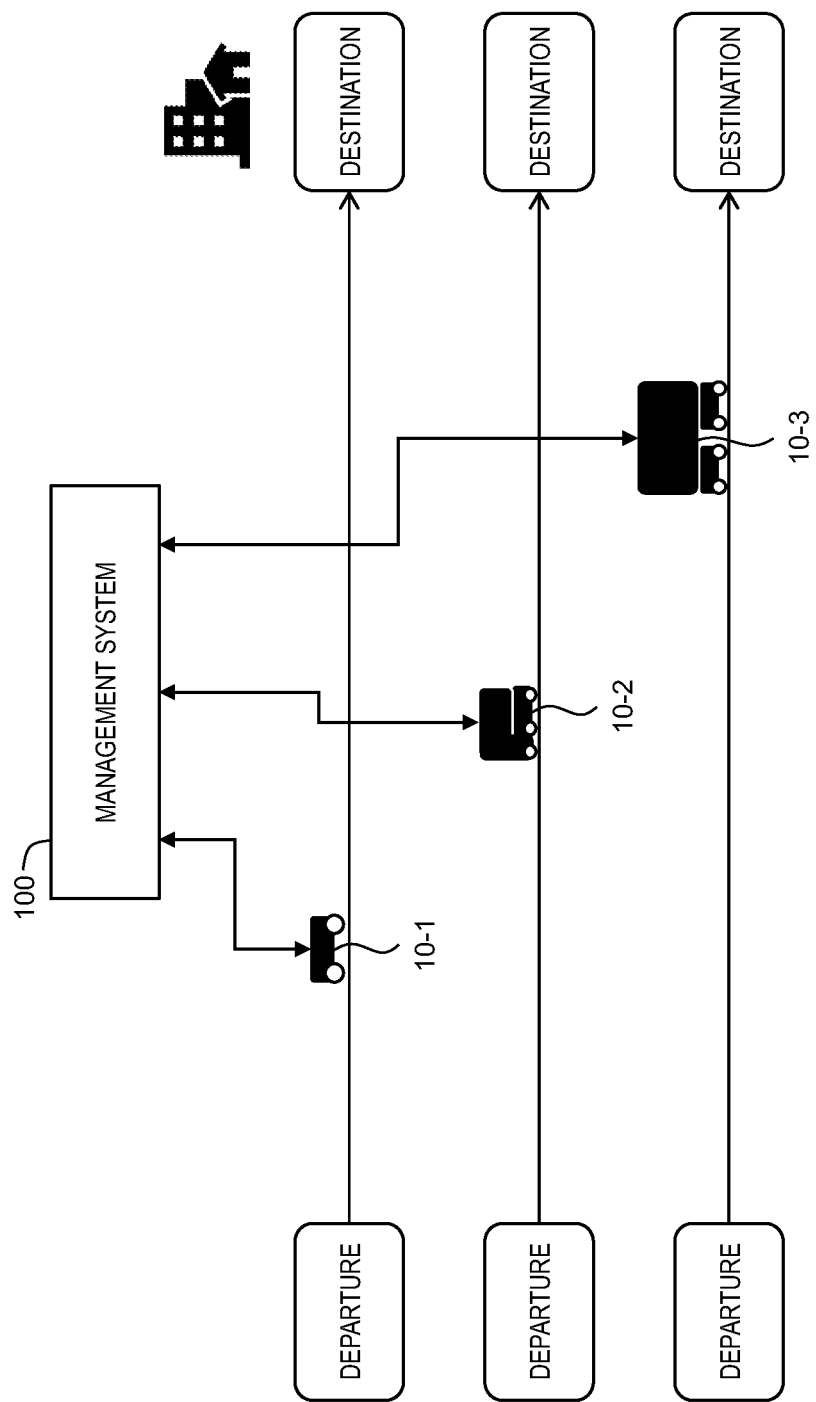
FIG. 2 is a conceptual diagram for explaining a logistics system according to an embodiment of the present disclosure.

FIGS. 1 and 2 are conceptual diagrams for explaining a logistics system 1 according to the present embodiment. The logistics system 1 provides a logistics service. A service area 2 is a predetermined area in which the logistics service is provided. For example, the service area 2 is a city such as a smart city. The logistics system 1 includes a plurality of logistics robots 10 and a management system 100.

The logistics robot 10 is a robot mainly used for delivering a package. The logistics robot 10 is configured to be capable of autonomous traveling and travels autonomously from a point of departure to a destination. For example, the point of departure is a collection point of packages (e.g. a logistics center), and the destination is a delivery destination of a package (e.g. a user's residence). As another example, the point of departure is a delivery destination of a package, and the destination is a delivery destination of another package. As yet another example, the point of departure is a delivery destination of a final package, and the destination is the collection point of packages.

A type of the logistics robot 10 is not limited to one. Multiple types of logistics robots 10 may be utilized. For example, as shown in FIG. 2, a small logistics robot 10-1, a medium logistics robot 10-2, a large logistics robot 10-3, and the like may be utilized.

The management system 100 manages the logistics service, manages and controls the logistics robots 10. The management system 100 is, for example, a management server. The management system 100 may be a distributed processing system.

The management system 100 is capable of communicating with each logistics robot 10 and collects information about a position and a status from each logistics robot 10. Moreover, the management system 100 receives a delivery request from a user of the logistics service. In response to the delivery request, the management system 100 assigns a logistics robot 10 that performs delivery, and determines a delivery route along which the logistics robot 10 delivers a package. Then, the management system 100 notifies the logistics robot 10 of the determined delivery route, and instructs the logistics robot 10 to deliver the package along the delivery route. The logistics robot 10 autonomously travels along the notified delivery route to deliver the package.

2. Delivery Route Determination Process

Figure 3:
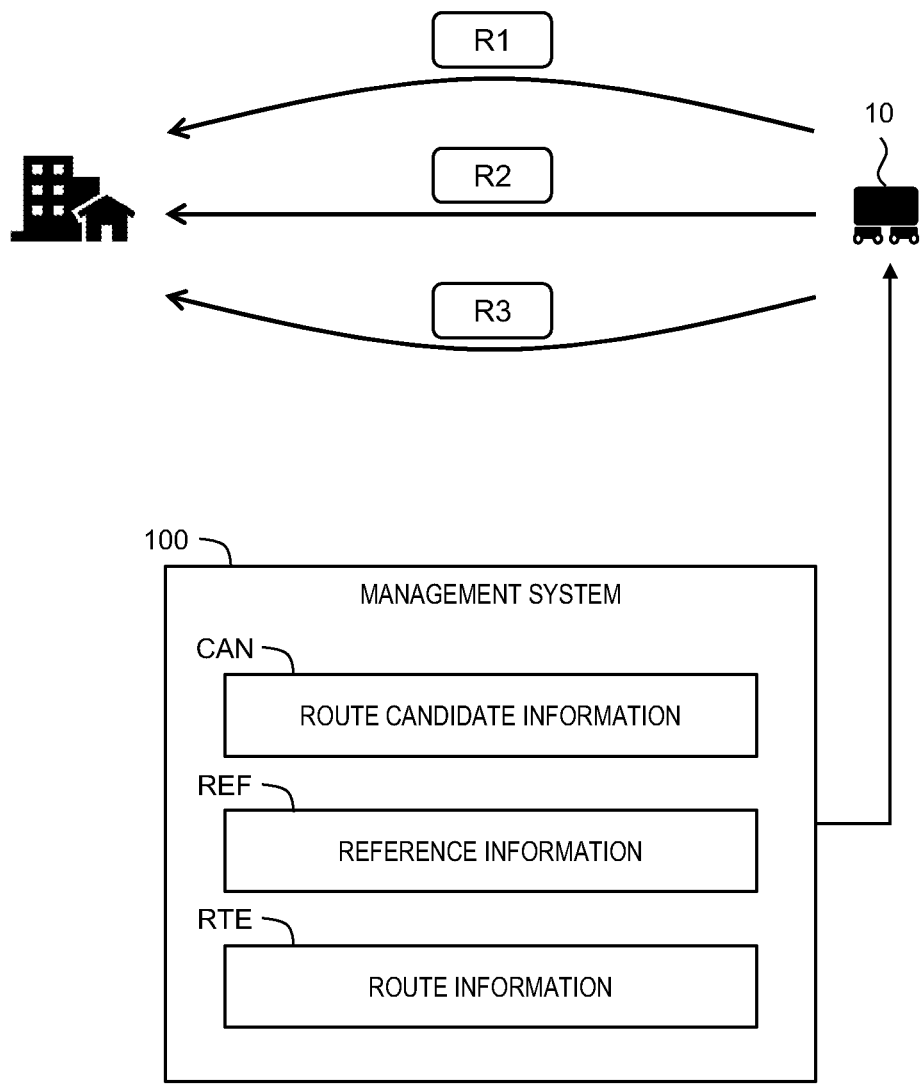
FIG. 3 is a conceptual diagram for explaining an outline of a delivery route determination process according to an embodiment of the present disclosure.

FIG. 3 shows a case where there are a plurality of candidates for the delivery route from a position of the logistics robot 10 to a delivery destination of the package. A candidate for the delivery route is hereinafter referred to as a "delivery route candidate." In the example shown in FIG. 3, there are three types of delivery route candidates R1 to R3.

According to the present embodiment, an appropriate delivery route is selected from the plurality of delivery route candidates according to a situation. "Reference information REF" is used for selecting an appropriate delivery route. For example, the reference information REF includes information of at least one of a congestion degree of each delivery route candidate, a time of day, a weather condition, energy consumption of the logistics robot 10 on each delivery route candidate, and a delivery route history of the logistics robot 10. Details of the reference information REF will be described later. Based on such the reference information REF, a delivery route is selected from the plurality of delivery route candidates. It is thus possible to determine an appropriate delivery route according to a situation.

For example, the management system 100 determines the delivery route. More specifically, the management system 100 extracts a plurality of delivery route candidates. Route candidate information CAN indicates the plurality of delivery route candidates. Moreover, the management system 100 acquires the reference information REF which will be described in detail later. Then, based on the reference information REF, the management system 100 selects a delivery route from the plurality of delivery route candidates indicated by the route candidate information CAN. Route information RTE indicates the selected delivery route. The management system 100 provides the route information RTE to the logistics robot 10, and instructs the logistics robot 10 to deliver the package in accordance with the route information RTE. Issuing the instruction to the logistics robot 10 is included in a concept of controlling the logistics robot 10. The logistics robot 10 autonomously travels along the delivery route indicated by the route information RTE to deliver the package.

As another example, the logistics robot 10 may determine the delivery route. In this case, the management system 100 provides the route candidate information CAN and the reference information REF to the logistics robot 10. Alternatively, the logistics robot 10 may acquire at least one of the route candidate information CAN and the reference information REF by itself. Based on the reference information REF, the logistics robot 10 selects a delivery route from the plurality of delivery route candidates indicated by the route candidate information CAN. That is to say, the logistics robot 10 generates the route information RTE by itself. Then, the logistics robot 10 autonomously travels along the delivery route indicated by the route information RTE to deliver the package.

Figure 4:
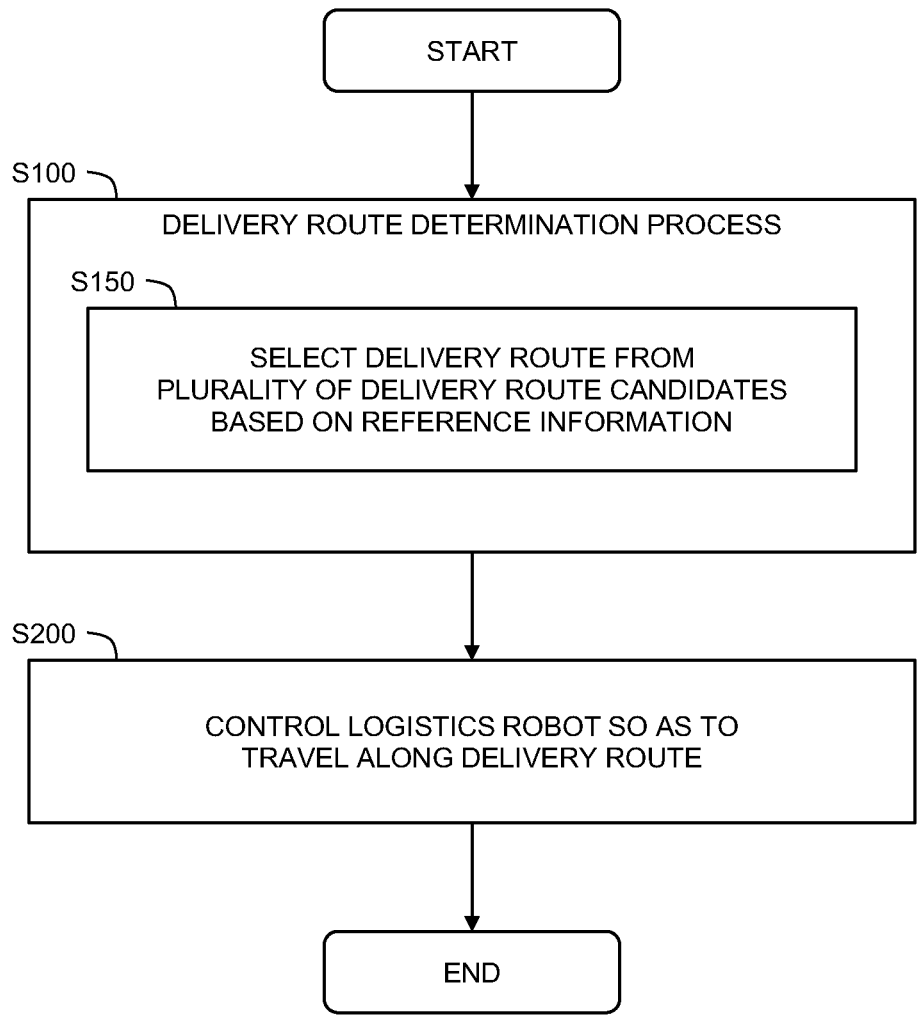
FIG. 4 is a flow chart showing in a summarized manner processing by a logistics system according to an embodiment of the present disclosure.

FIG. 4 is a flow chart showing in a summarized manner the processing by the logistics system 1 according to the present embodiment.

In Step S100, the logistics system 1 (i.e., the management system 100 or the logistics robot 10) executes a "delivery route determination process" that determines a delivery route along which the logistics robot 10 delivers the package. In particular, when there are a plurality of delivery route candidates, the logistics system 1 selects the delivery route from the plurality of delivery route candidates based on the reference information REF (Step S150).

In Step S200, the logistics system 1 executes a "logistics robot control process." More specifically, the logistics system 1 (i.e., the management system 100 or the logistics robot 10) controls the logistics robot 10 so as to deliver the package along the delivery route determined in Step S100. It should be noted that issuing an instruction from the management system 100 to the logistics robot 10 also is included in the concept of controlling the logistics robot 10.

As described above, according to the present embodiment, when there are a plurality of delivery route candidates, it is possible to determine an appropriate delivery route according to a situation.

Hereinafter, various examples of the "delivery route determination process" according to the present embodiment will be described.

2-1. First Example

Figure 5:
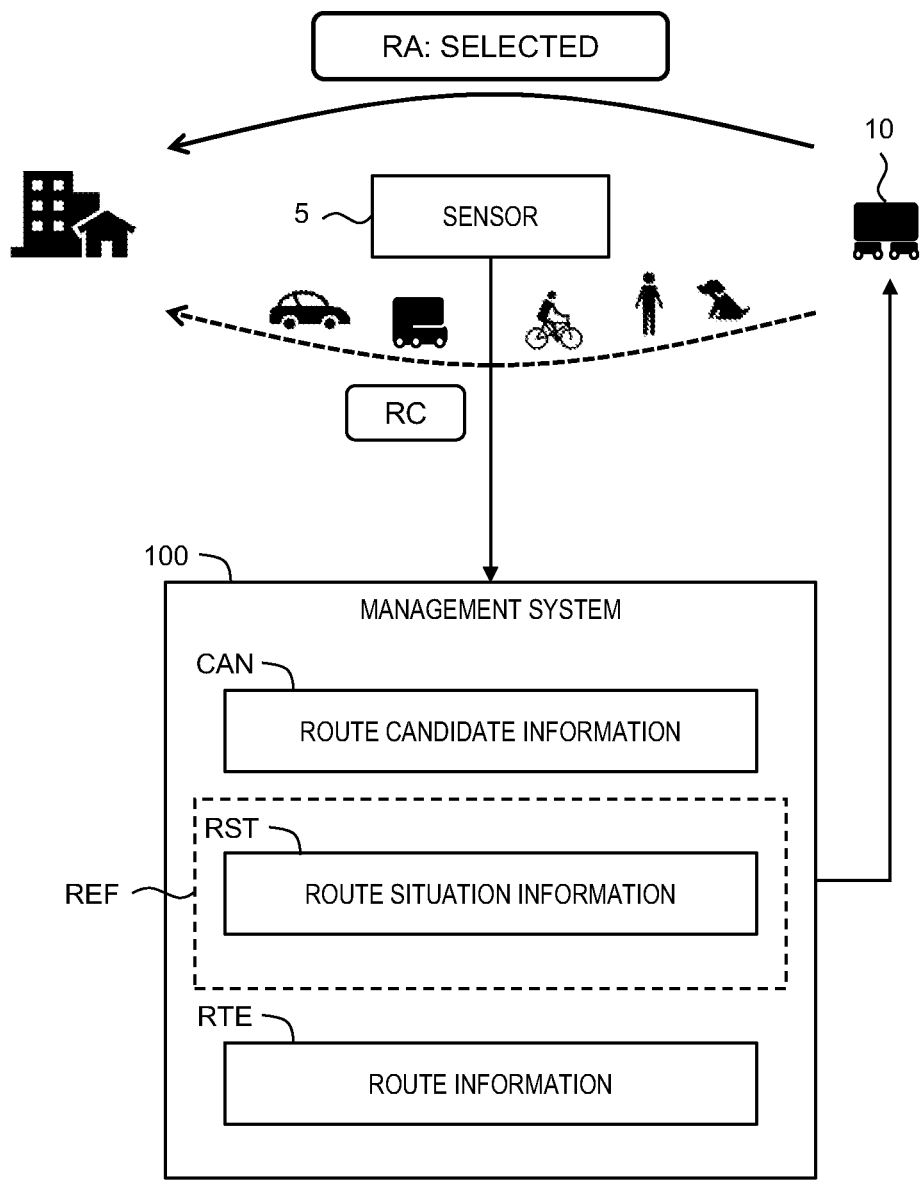
FIG. 5 is a conceptual diagram for explaining a first example of a delivery route determination process according to an embodiment of the present disclosure.

FIG. 5 is a conceptual diagram for explaining a first example of the delivery route determination process. A lot of sensors 5 for recognizing a surrounding situation are installed in the service area 2. For example, the sensor 5 is a camera and captures image information indicating the surrounding situation. The sensor 5 is capable of communicating with the management system 100 and transmits recognized information (e.g., the image information) to the management system 100.

The management system 100 recognizes a situation of each of the plurality of delivery route candidates based on the recognized information received from the sensor 5. Route situation information RST is information indicating the situation of each delivery route candidate. For example, the route situation information RST includes the image information along each delivery route candidate.

The management system 100 calculates a "congestion degree" of each delivery route candidate based on the route situation information RST. Here, the congestion degree indicates how crowded the delivery route candidate is with moving bodies. Examples of the moving body include a person, a vehicle, a robot (including other logistics robots 10), an animal, and the like. For example, the congestion degree is an average value of moving body densities along the delivery route candidate. Different weighting may be performed for each type of the moving body. As another example, the congestion degree may be a peak value of the moving body densities along the delivery route candidate. For example, when the route situation information RST includes the image information, the congestion degree can be calculated by analyzing the image information to identify the moving bodies. The route situation information RST may include the congestion degree calculated for each delivery route candidate.

In the first example, the reference information REF includes the route situation information RST described above. That is, the management system 100 selects a delivery route from the plurality of delivery route candidates based on the route situation information RST. In particular, the management system 100 selects a delivery route from the plurality of delivery route candidates based on the congestion degree of each delivery route candidate.

More specifically, the management system 100 selects one with the lowest congestion degree among the plurality of delivery route candidates as the delivery route. In the example shown in FIG. 5, there are two delivery route candidates RA and RC. The congestion degree of the delivery route candidate RC is high, and the congestion degree of the delivery route candidate RA is low. In this case, the management system 100 selects the delivery route candidate RA as the delivery route.

As described above, according to the first example, one with the lowest congestion degree among the plurality of delivery route candidates is selected as the delivery route. The logistics robot 10 is able to smoothly move through the uncrowded delivery route. Moreover, in the uncrowded delivery route, a risk of contact between the logistics robot 10 and another moving body is greatly reduced. As described above, a delivery efficiency is improved and safety is improved as well.

2-2. Second Example

Figure 6:
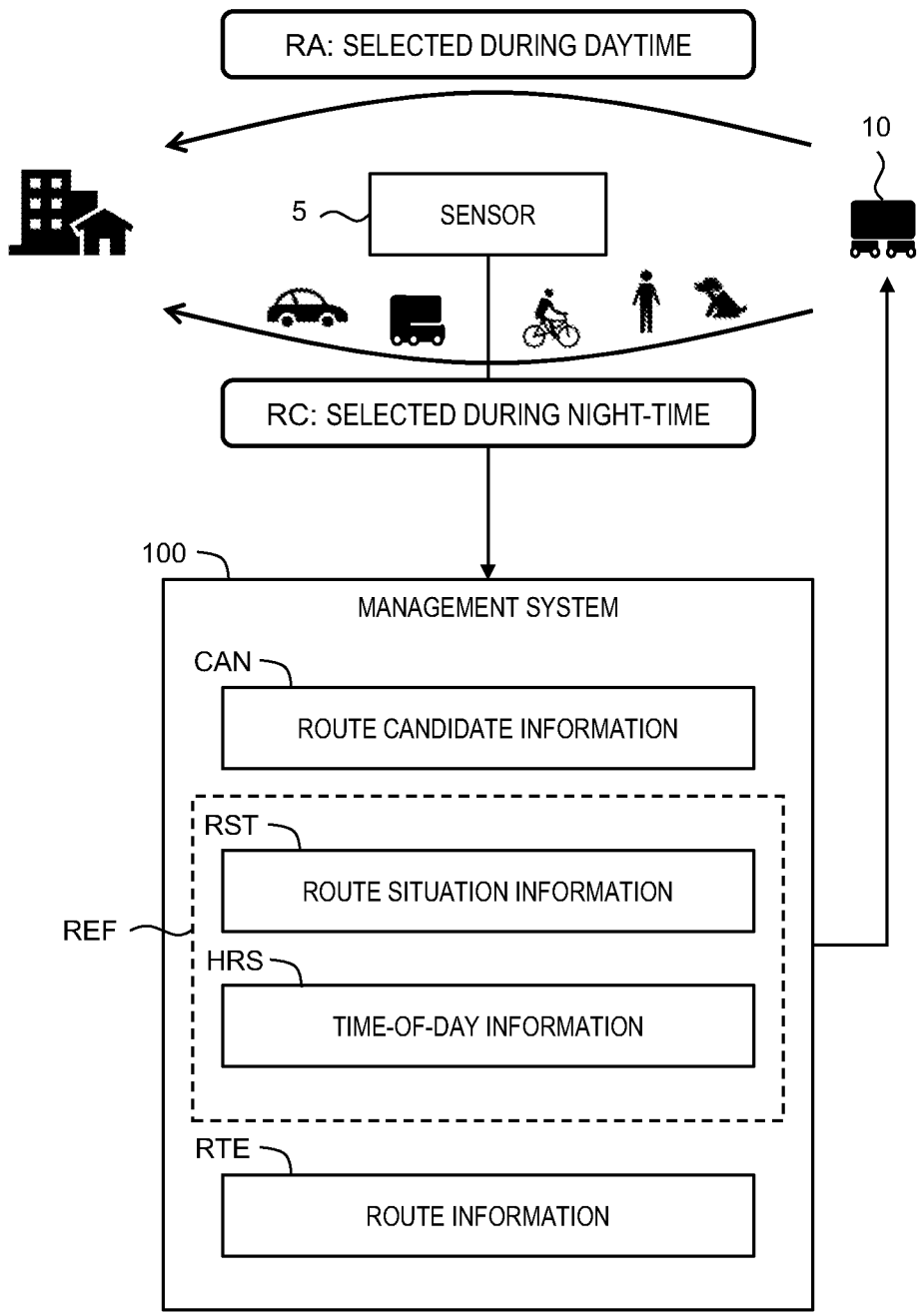
FIG. 6 is a conceptual diagram for explaining a second example of a delivery route determination process according to an embodiment of the present disclosure.

FIG. 6 is a conceptual diagram for explaining a second example of the delivery route determination process. A description overlapping with the first example will be omitted as appropriate.

In the second example, the reference information REF includes time-of-day information HRS in addition to the route situation information RST described above. The time-of-day information HRS indicates whether a current time is a first time of day or a second time of day. For example, the first time of day is a daytime, and the second time of day is a night-time. The time-of-day information HRS is acquired from a system clock. The management system 100 selects a delivery route from the plurality of delivery route candidates based on the congestion degree of each delivery route candidate and the time of day.

More specifically, during the daytime, the management system 100 selects one with the lowest congestion degree among the plurality of delivery route candidates as the delivery route. On the other hand, during the night-time, the management system 100 selects one with the highest congestion degree among the plurality of delivery route candidates as the delivery route. That is to say, the management system 100 switches a selection policy for selecting the delivery route for the daytime and that for the night-time.

During the daytime, one with the lowest congestion degree among the plurality of delivery route candidates is selected as the delivery route. The logistics robot 10 is able to smoothly move through the uncrowded delivery route. Moreover, in the uncrowded delivery route, a risk of contact between the logistics robot 10 and another moving body is greatly reduced. Therefore, in the daytime package delivery, a delivery efficiency is improved and safety is improved as well.

On the other hand, during the night-time, one with the highest congestion degree among the plurality of delivery route candidates is selected as the delivery route. In this case, the logistics robot 10 can play a role of monitoring the night-time city, concurrently with the package delivery. Moreover, during the night-time, mere presence of the logistics robot 10 nearby can make people feel senses of security.

2-3. Third Example

Figure 7:
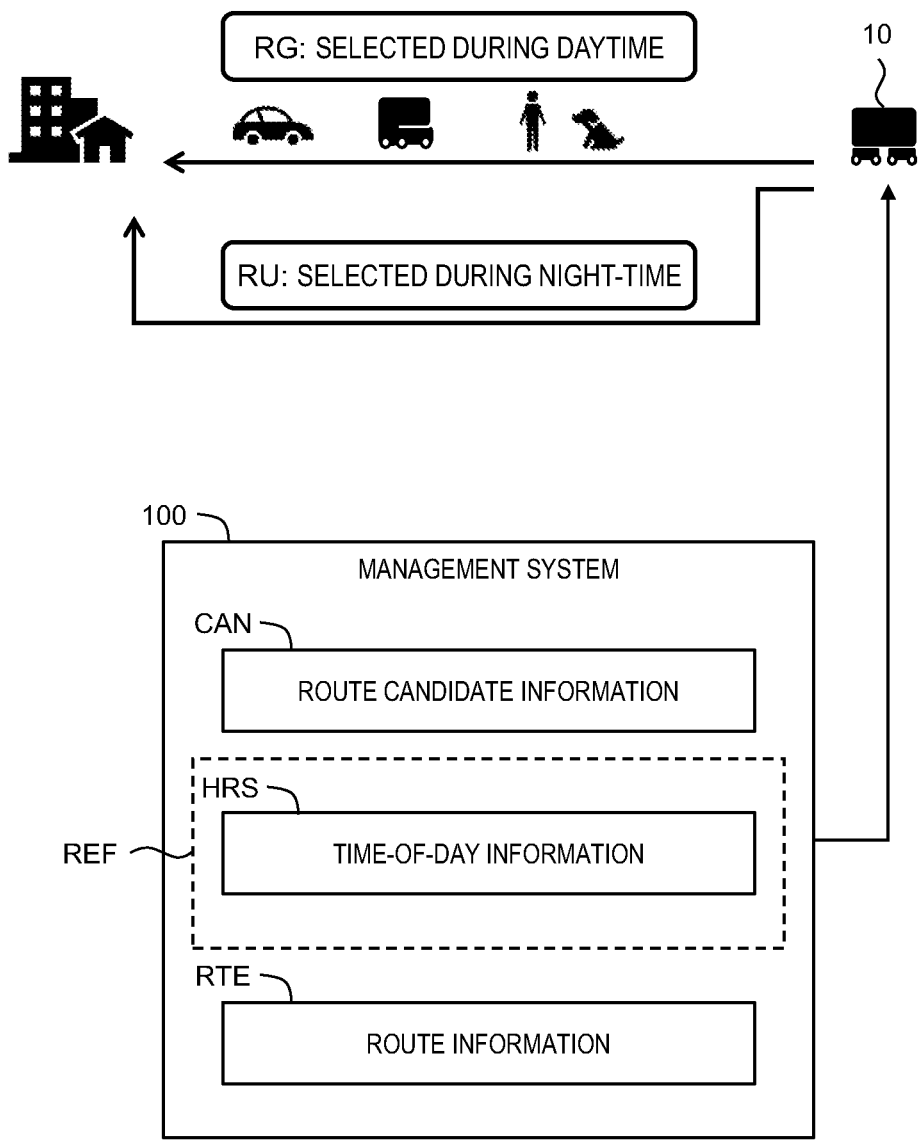
FIG. 7 is a conceptual diagram for explaining a third example of a delivery route determination process according to an embodiment of the present disclosure.

FIG. 7 is a conceptual diagram for explaining a third example of the delivery route determination process. In the third example, the plurality of delivery route candidates include a ground route RG and an underground route RU. In a case of the underground route RU, there is less interference with people as compared with a case of the ground route RG. The underground route RU may be a delivery route dedicated to the logistics robot 10. Typically, a distance to the delivery destination along the underground route RU is longer than a distance to the delivery destination along the ground route RG, because it is necessary to go underground.

In the third example, the reference information REF includes time-of-day information HRS. The time-of-day information HRS indicates whether a current time is a first time of day or a second time of day. For example, the first time of day is a daytime, and the second time of day is a night-time. The time-of-day information HRS is acquired from a system clock. The management system 100 selects a delivery route from the plurality of delivery route candidates based on the time-of-day information HRS.

More specifically, during the daytime, the management system 100 selects the ground route RG as the delivery route. On the other hand, during the night-time, the management system 100 selects the underground route RU as the delivery route. That is to say, the management system 100 switches a selection policy for selecting the delivery route for the daytime and that for the night-time.

During the night-time, the underground route RU is selected as the delivery route. During the night-time, visibility in the ground route RG becomes poor and thus a probability of contact between the logistics robot 10 and people may increase. Therefore, selecting the underground route RU with less interference with people makes it possible to reduce a risk of contact between the logistics robot 10 and people. Moreover, a possibility that the logistics robot 10 gets into a trouble is reduced.

On the other hand, during the daytime, the ground route RG is selected as the delivery route. Typically, the distance to the delivery destination along the ground route RG is shorter than the distance to the delivery destination along the underground route RU. Selecting the shorter ground route RG makes it possible to reduce a time required for the delivery.

2-4. Fourth Example

Figure 8:
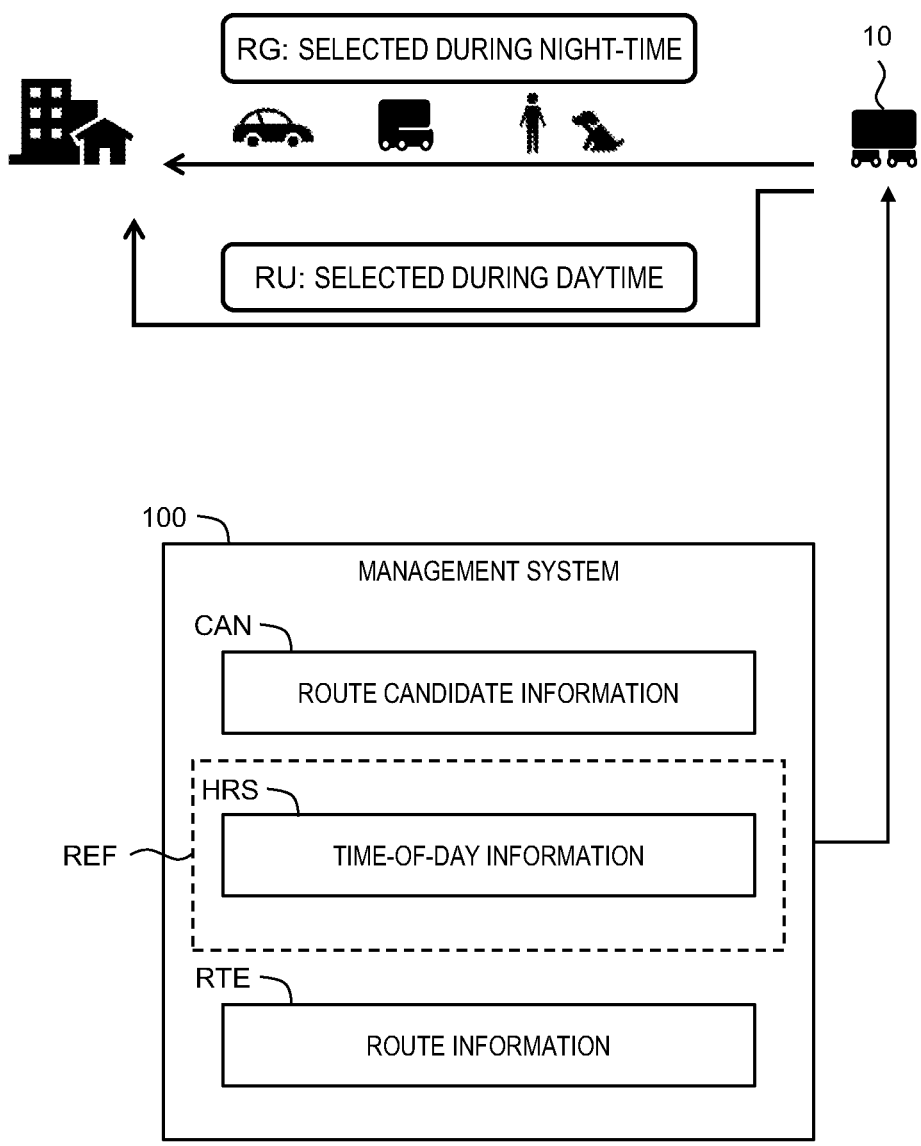
FIG. 8 is a conceptual diagram for explaining a fourth example of a delivery route determination process according to an embodiment of the present disclosure.

FIG. 8 is a conceptual diagram for explaining a fourth example of the delivery route determination process. A description overlapping with the third example described above will be omitted as appropriate.

In the fourth example, during the daytime, the management system 100 selects the underground route RU as the delivery route. On the other hand, during the night-time, the management system 100 selects the ground route RG as the delivery route. That is to say, the management system 100 switches a selection policy for selecting the delivery route for the daytime and that for the night-time.

During the daytime, the underground route RU is selected as the delivery route. In the case of the underground route RU, there is less interference with people as compared with the case of the ground route RG. Thus, the logistics robot 10 is able to smoothly move through the underground route RU. Moreover, a risk of contact between the logistics robot 10 and people is greatly reduced. Therefore, in the daytime package delivery, a delivery efficiency is improved and safety is improved as well.

On the other hand, during the night-time, the ground route RG is selected as the delivery route. In this case, the logistics robot 10 can play a role of monitoring the night-time city, concurrently with the package delivery. Moreover, during the night-time, mere presence of the logistics robot 10 nearby can make people feel senses of security.

2-5. Fifth Example

Figure 9:
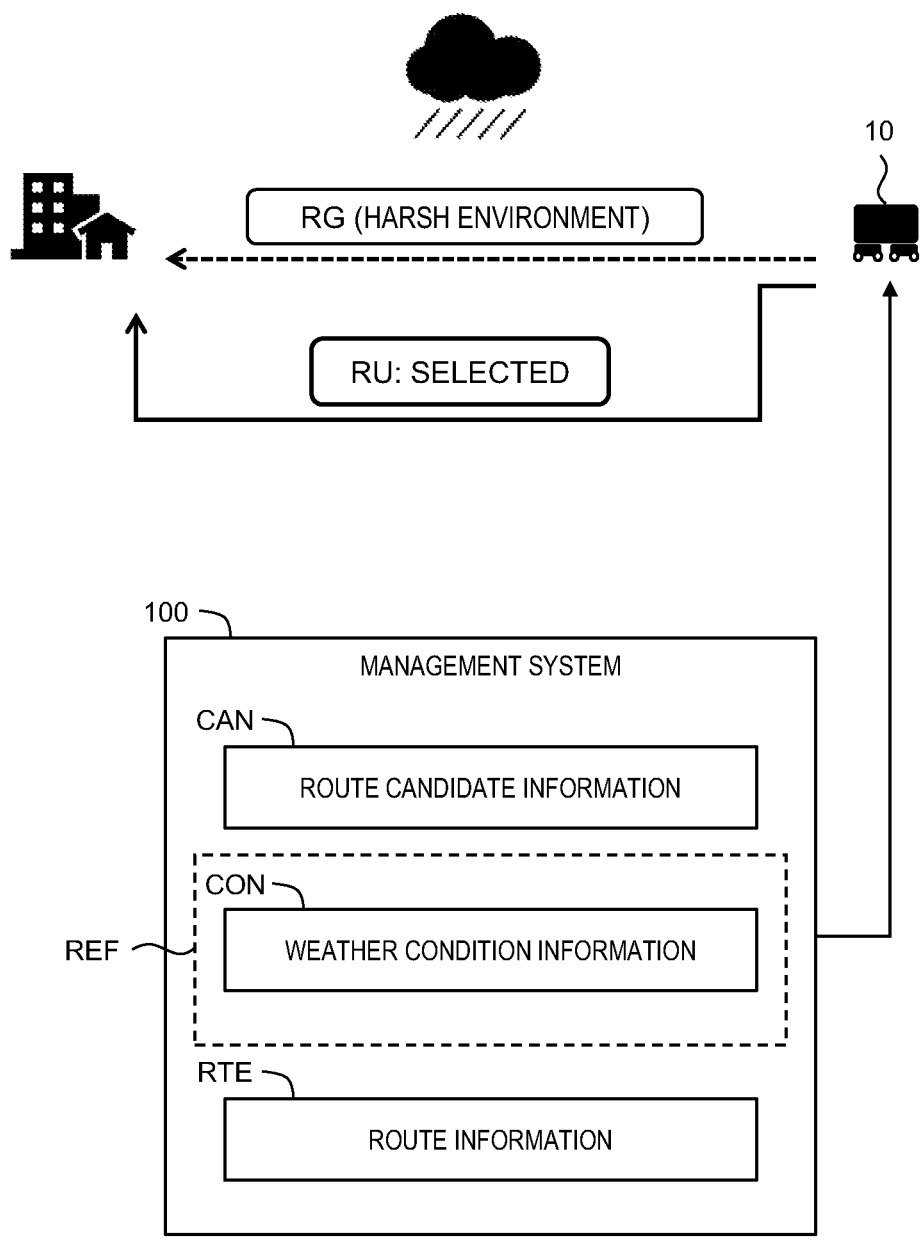
FIG. 9 is a conceptual diagram for explaining a fifth example of a delivery route determination process according to an embodiment of the present disclosure.

FIG. 9 is a conceptual diagram for explaining a fifth example of the delivery route determination process. As in the case of the third example described above, the plurality of delivery route candidates include the ground route RG and the underground route RU.

In a fifth example, the reference information REF includes weather condition information CON. The weather condition information CON indicates a parameter related to a weather condition. The parameters related to the weather condition includes at least one of an amount of rainfall, an amount of snowfall, an amount of dust fall, a wind speed, a fog density, and a temperature. Such the weather condition information CON is provided by, for example, a weather information service system. The management system 100 acquires the weather condition information CON from the weather information service system.

The management system 100 selects a delivery route from the plurality of delivery route candidates based on the weather condition information CON. More particularly, the management system 100 determines whether or not the ground route RG is in a harsh environment based on the weather condition information CON. For example, when the parameter indicated by the weather condition information CON is equal to or greater than a threshold, the management system 100 determines that the ground route RG is in a harsh environment. In the harsh environment, accuracy of a recognition function of the logistics robot 10 is reduced. Moreover, a large amount of rain or snow interferes the traveling of the logistics robot 10.

In view of the above, when the parameter indicated by the weather condition information CON is equal to or greater than the threshold, the management system 100 does not select the ground route RG but selects the underground route RU as the delivery route. This makes it possible to safely perform the package delivery without being affected by the harsh environment.

On the other hand, when the parameter indicated by the weather condition information CON is less than the threshold, the ground route RG is not in the harsh environment. Therefore, the management system 100 may select the ground route RG as the delivery route. For example, the distance to the delivery destination along the ground route RG is shorter than the distance to the delivery destination along the underground route RU. Selecting the shorter ground route RG makes it possible to reduce a time required for the delivery.

2-6. Sixth Example

Figure 10:
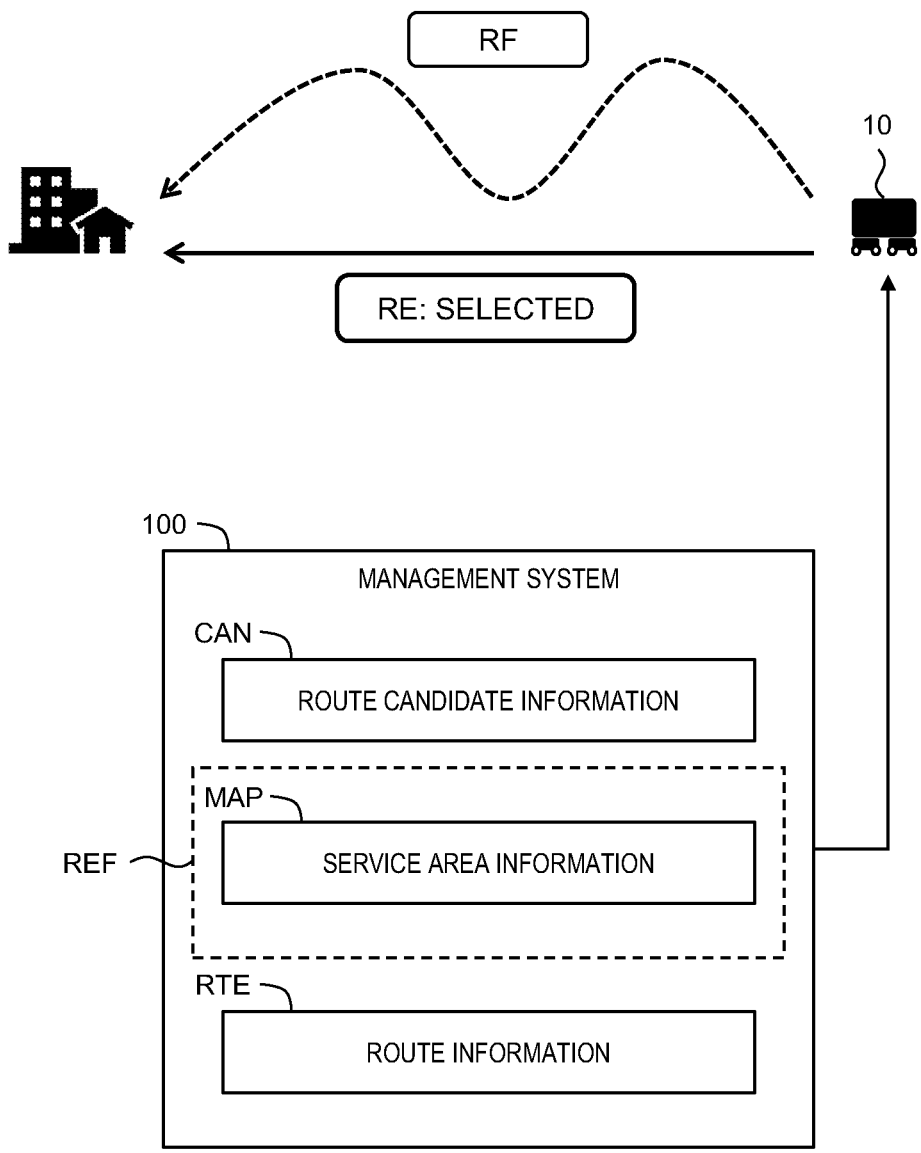
FIG. 10 is a conceptual diagram for explaining a sixth example of a delivery route determination process according to an embodiment of the present disclosure.

FIG. 10 is a conceptual diagram for explaining a sixth example of the delivery route determination process. In the sixth example, the reference information REF includes service area information MAP. The service area information MAP indicates a configuration of the service area 2 (see FIG. 1) in which the logistics service is provided. For example, the service area information MAP includes a three-dimensional road map, a building layout, a floor configuration in a building, a room layout of each floor, an elevator layout of a building, and the like.

The management system 100 estimates energy consumption of the logistics robot 10 along each delivery route candidate based on the service area information MAP. The energy consumption can be calculated based on a distance and a difference in height along each delivery route candidate. Then, the management system 100 selects a delivery route from the plurality of delivery route candidates based on the energy consumption of the logistics robot 10.

More specifically, the management system 100 selects one with the lowest energy consumption among the plurality of delivery route candidates as the delivery route. In the example shown in FIG. 10, there are two delivery route candidates RE and RF. The energy consumption along the delivery route candidate RE is low, and the energy consumption along the delivery route candidate RF is high. Therefore, the management system 100 selects the delivery route candidate RE as the delivery route.

As described above, according to the sixth example, one with the lowest energy consumption among the plurality of delivery route candidates is selected as the delivery route. It is thus possible to reduce the energy required for the package delivery. Selecting an energy saving delivery route is preferable especially in a situation where the energy is tight in the service area 2 as a whole.

2-7. Seventh Example

Figure 11:
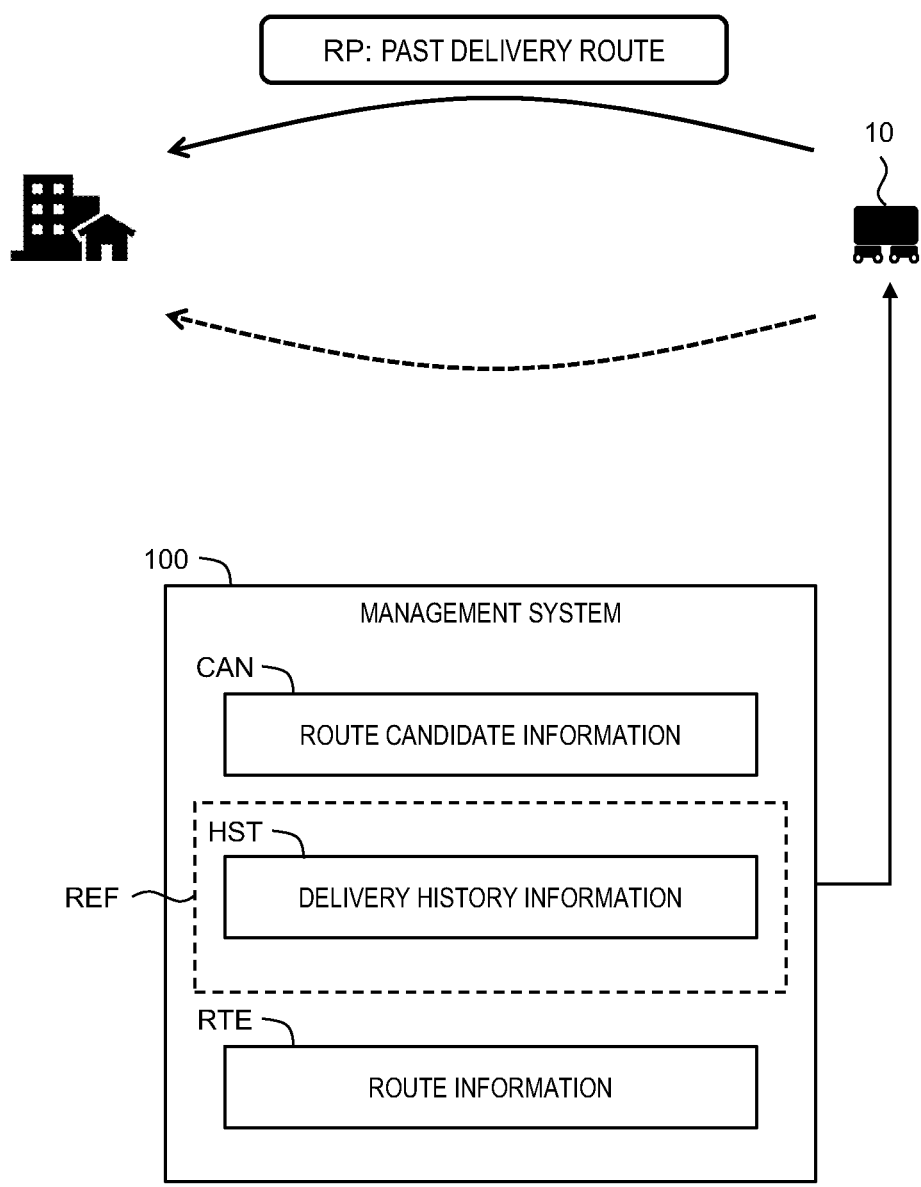
FIG. 11 is a conceptual diagram for explaining a seventh example of a delivery route determination process according to an embodiment of the present disclosure.

FIG. 11 is a conceptual diagram for explaining a seventh example of the delivery route determination process. In the seventh example, the reference information REF includes delivery history information HST. The delivery history information HST indicates a delivery history of the logistics robot 10. In particular, the delivery history information HST indicates a past delivery route RP along which the logistics robot 10 has traveled in the past.

The management system 100 selects a delivery route from the plurality of delivery route candidates based on the delivery history information HST. More specifically, when the plurality of delivery route candidates includes the past delivery route RP, the management system 100 selects the past delivery route RP as the delivery route. Since the past delivery route RP is a delivery route that has resulted in successful package delivery in the past, the package delivery this time also is highly likely to be done successfully.

2-8. Eighth Example

A combination of two or more examples described above also is possible. That is, it is also possible to perform the delivery route determination process by considering two or more of a plurality of parameters such as the congestion degree of the delivery route candidate, the time of day, the weather condition, the energy consumption, and the delivery route history. For example, a score is calculated by combining each parameter. Then, priority is set to be higher as the score becomes higher.

2-9. Ninth Example

In a ninth example, the logistics robot 10 executes the delivery route determination process. The management system 100 provides the route candidate information CAN and the reference information REF to the logistics robot 10. Alternatively, the logistics robot 10 may acquire at least one of the route candidate information CAN and the reference information REF by itself. Based on the reference information REF, the logistics robot 10 selects a delivery route from the plurality of delivery route candidates indicated by the route candidate information CAN.

3. Logistics Robot

3-1. Configuration Example

Figure 12:
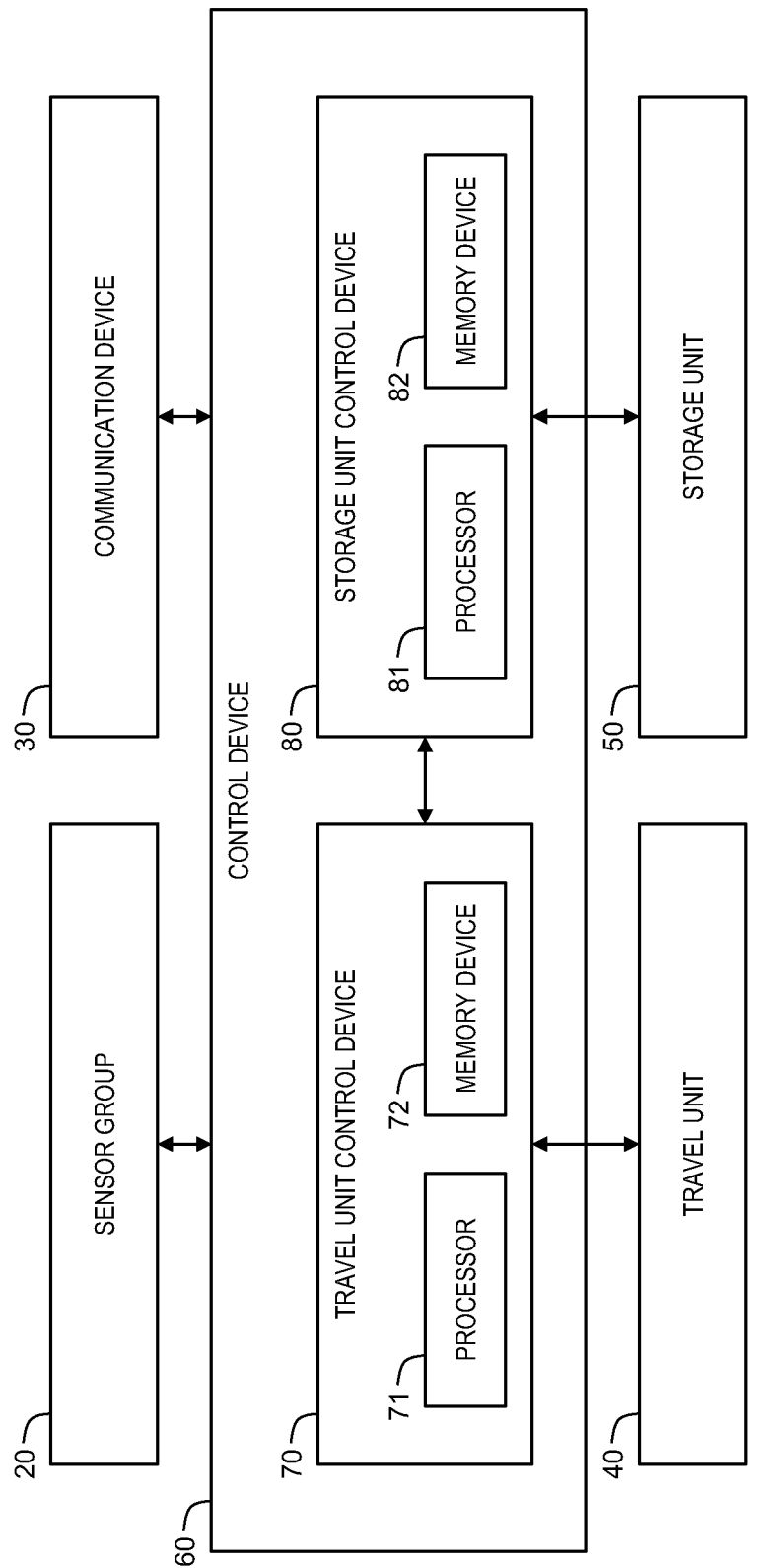
FIG. 12 is a block diagram showing a configuration example of a logistics robot according to an embodiment of the present disclosure.

FIG. 12 is a block diagram showing a configuration example of the logistics robot 10 according to the present embodiment. The logistics robot 10 includes a sensor group 20, a communication device 30, a travel unit 40, a storage unit 50, and a control device 60.

The sensor group 20 includes a position sensor, a state sensor, a recognition sensor, and the like. The position sensor acquires a position and an orientation of the logistics robot 10. Examples of the position sensor include a GNSS (Global Navigation Satellite System) receiver. The state sensor detects a state of the logistics robot 10. Examples of the state of the logistics robot 10 include a wheel speed, a speed, an acceleration (a longitudinal acceleration, a lateral acceleration, and the like), an angular velocity (a yaw rate, and the like), a loading weight, a remaining battery level, a failure status, and the like. The recognition sensor recognizes a situation around the logistics robot 10. Examples of the recognition sensor include a camera, a LIDAR (LIght Detection And Ranging), a radar, a sonar, and the like.

The communication device 30 communicates with the outside of the logistics robot 10. For example, the communication device 30 communicates with the management system 100 through a wireless communication network such as 4G, 5G, and the like. The communication device 30 may be connected to a wireless LAN. The communication device 30 may perform a near field communication with another logistics robot 10 nearby. Examples of the near field communication system include infrared communication, Bluetooth (registered trademark), and the like.

The travel unit 40 accelerates, decelerates, and turns the logistics robot 10. For example, the travel unit 40 includes wheels, electric motors for driving the wheels, driving circuits for driving the electric motors, a battery for supplying power, and the like. Acceleration and deceleration of the logistics robot 10 are performed by controlling the electric motor. Braking may be performed by the use of regenerative braking by control of the electric motor. Moreover, at least one of the wheels may be provided with a mechanical brake. Turning of the logistics robot 10 can be realized by controlling a difference in rotation speed between the left and right wheels (motors). As another example, a steering mechanism for steering the wheel may be provided. A certain wheel may be an omni wheel.

The storage unit 50 stores a package. For example, the storage unit 50 includes a storage box, an actuator for automatically opening and closing a lid of the storage box, an actuator for changing a position and an orientation of the storage box, an arm for taking out the package from the storage box, and the like.

The control device (controller) 60 controls the logistics robot 10. For example, the control device 60 includes a travel unit control device 70 that controls the travel unit 40 and a storage unit control device 80 that controls the storage unit 50. The travel unit control device 70 and the storage unit control device 80 are communicatively connected with each other and perform processing in cooperation with each other.

The travel unit control device 70 includes one or more processors 71 (hereinafter, simply referred to as a "processor 71") that execute a variety of processing and one or more memory devices 72 (hereinafter, simply referred to as a "memory device 72") that store a variety of information. For example, the processor 71 includes a CPU (Central Processing Unit). Examples of the memory device 72 include a volatile memory, a non-volatile memory, an HDD (Hard Disk Drive), an SSD (Solid State Drive), and the like. The function of the travel unit control device 70 is implemented by the processor 71 executing a computer program. The computer program may be recorded on a non-transitory computer-readable recording medium.

The storage unit control device 80 includes one or more processors 81 (hereinafter, simply referred to as a "processor 81") that execute a variety of processing and one or more memory devices 82 (hereinafter, simply referred to as a "memory device 82") that store a variety of information. For example, the processor 81 includes a CPU. Examples of the memory device 82 include a volatile memory, a non-volatile memory, an HDD, an SSD, and the like. The function of the storage unit control device 80 is implemented by the processor 81 executing a computer program. The computer program may be recorded on a non-transitory computer-readable recording medium.

3-2. Example of Variety of Information

Figure 13:
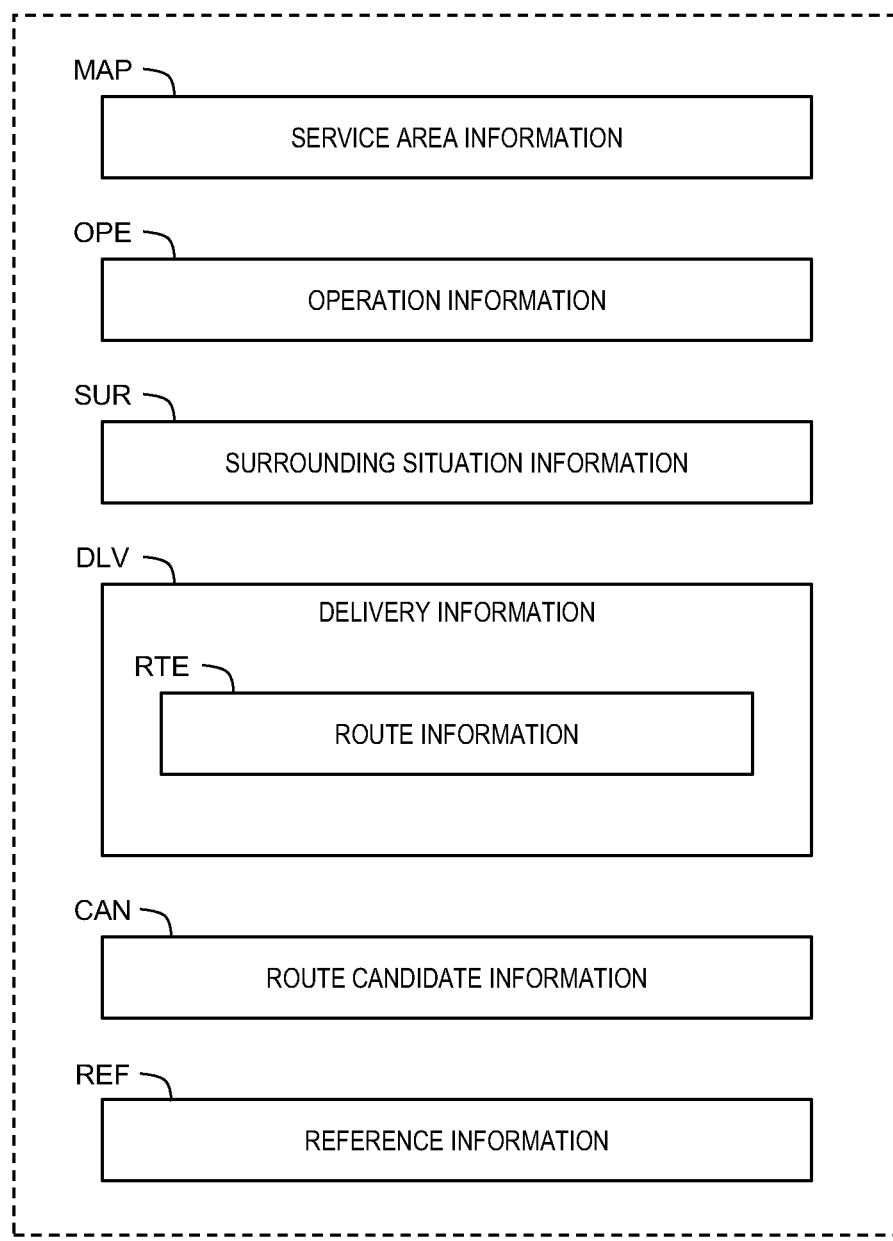
FIG. 13 is a block diagram showing an example of a variety of information in a logistics robot according to an embodiment of the present disclosure.

FIG. 13 is a block diagram showing an example of a variety of information in the logistics robot 10. The variety of information is stored in the memory device 72 and the memory device 82.

Service area information MAP indicates a configuration of the service area 2 (see FIG. 1) in which the logistics service is provided. For example, the service area information MAP includes a three-dimensional road map, a building layout, a floor configuration in a building, a room layout of each floor, an elevator layout of a building, and the like. The service area information MAP is provided, for example, from the management system 100. The control device 60 acquires the service area information MAP from the management system 100 via the communication device 30.

Operation information OPE indicates the position and the state of the logistics robot 10. The position of the logistics robot 10 is acquired by the position sensor of the sensor group 20. The control device 60 may acquire high accuracy position information by a well-known localization process. The state of the logistics robot 10 is detected by the state sensor of the sensor group 20. Examples of the state of the logistics robot 10 include a wheel speed, a speed, an acceleration (a longitudinal acceleration, a lateral acceleration, and the like), an angular velocity (a yaw rate, and the like), a loading weight, a remaining battery level, a failure status, and the like. The control device 60 acquires the operation information OPE from the sensor group 20.

Surrounding situation information SUR indicates a situation around the logistics robot 10. The surrounding situation information SUR is obtained from a result of recognition by the recognition sensor of the sensor group 20. For example, the surrounding situation information SUR includes an image (video) captured by the camera. The surrounding situation information SUR may include object information regarding an object around the logistics robot 10. Examples of the object around the logistics robot 10 include a pedestrian, a mobility (a vehicles, a robot), a sign, a white line, a roadside structure, a building, and the like. The object information indicates a relative position and a relative velocity of the object relative to the logistics robot 10.

Delivery information DLV is information regarding the package delivery. For example, the delivery information DLV includes package information indicating a delivery destination of each package. Furthermore, the delivery information DLV includes the route information RTE indicating the delivery route along which the logistics robot 10 travels. For example, the delivery information DLV is provided from the management system 100. The control device 60 acquires the delivery information DLV from the management system 100 via the communication device 30. As another example, the control device 60 may generate the route information RTE based on the delivery destination of the package and the service area information MAP.

The route candidate information CAN indicates the plurality of delivery route candidates from the position of the logistics robot 10 to the delivery destination of the package. For example, the route candidate information CAN is provided from the management system 100. The control device 60 acquires the route candidate information CAN from the management system 100 via the communication device 30. As another example, the control device 60 may generate the route candidate information CAN based on the delivery destination of the package and the service area information MAP.

The reference information REF is information used for selecting the delivery route from the plurality of delivery route candidates. Examples of the reference information REF include those described in the above Section 2. For example, the reference information REF is provided from the management system 100. The control device 60 acquires the reference information REF from the management system 100 via the communication device 30. As another example, the control device 60 may acquire by itself the reference information REF such as the time-of-day information HRS, the weather condition information CON, and the like.

3-3. Delivery Process

The travel unit control device 70 (the processor 71) performs travel control (acceleration control, deceleration control, and turning control) by controlling the travel unit 40. The speed, the acceleration, and the angular velocity of the logistics robot 10 are obtained from the operation information OPE. The travel unit control device 70 may perform the travel control so as to avoid a collision with an object around the logistics robot 10, based on the surrounding situation information SUR.

In particular, the travel unit control device 70 (the processor 71) performs autonomous travel control such that the logistics robot 10 travels toward a destination. More specifically, based on the service area information MAP, the operation information OPE (the position information), and the delivery information DLV (the route information RTE), the travel unit control device 70 performs the autonomous travel control such that the logistics robot 10 travels along the delivery route.

The travel unit control device 70 (the processor 71) may perform the delivery route determination process (FIG. 4, Step S100). For example, the route candidate information CAN and the reference information REF are provided from the management system 100. The travel unit control device 70 acquires the route candidate information CAN and the reference information REF from the management system 100 via the communication device 30. As another example, the travel unit control device 70 may generate by itself the route candidate information CAN based on the delivery destination of the package and the service area information MAP. As yet another example, the travel unit control device 70 may acquire by itself the reference information REF such as the time-of-day information HRS and the weather condition information CON. Based on the reference information REF, the travel unit control device 70 (the processor 71) selects the delivery route from the plurality of delivery route candidates indicated by the route candidate information CAN (see Section 2 above).

When the logistics robot 10 arrives at the delivery destination of the package, the storage unit control device 80 (the processor 81) controls the storage unit 50 for unloading the package. For example, the storage unit control device 80 automatically opens and closes the lid of the storage box, changes the position and the orientation of the storage box, takes out the package from the storage box, and so forth. Similarly, the storage unit control device 80 may control the storage unit 50 to pick up a package.

3-4. Monitoring Function

The control device 60 may transmit the surrounding situation information SUR to the management system 100 via the communication device 30. An operator of the management system 100 is able to monitor the situation of the service area 2 based on the surrounding situation information SUR.

Moreover, the control device 60 may detect an abnormal event based on the surrounding situation information SUR. Examples of the abnormal event include sick people, crimes, and the like. When detecting the abnormal event, the control device 60 transmits an alert to the management system 100 via the communication device 30. The operator of the management system 100 recognizes the abnormal event and takes an action.

4. Management System

4-1. Configuration Example

Figure 14:
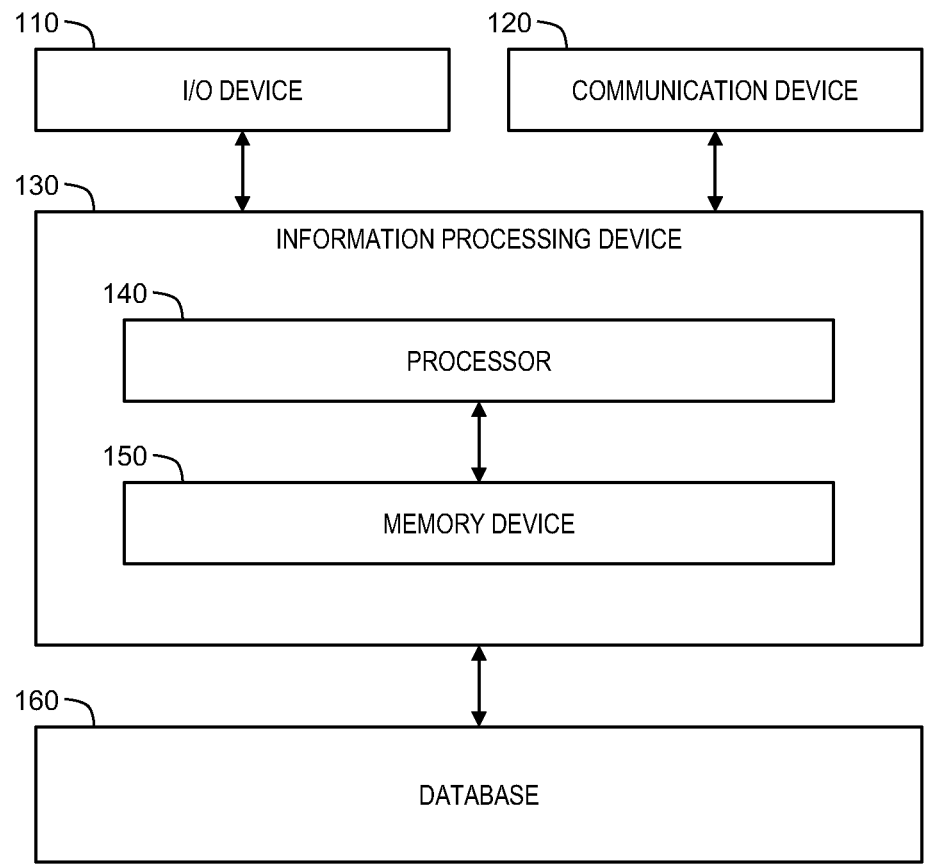
FIG. 14 is a block diagram showing a configuration example of a management system according to an embodiment of the present disclosure.

FIG. 14 is a block diagram showing a configuration example of the management system 100 according to the present embodiment. For example, the management system 100 is a management server. The management system 100 may be a distributed processing system. The management system 100 includes an input/output device 110, a communication device 120, an information processing device 130, and a database 160.

The input/output device 110 is an interface for receiving information from an operator of the management system 100 and providing the operator with information. Examples of the input device include a keyboard, a mouse, a touch panel, a switch, and the like. Examples of the output device include a display device, a speaker, and the like. The operator is able to monitor a status of the logistics service by the use of the input/output device 110.

The communication device 120 performs a communication with the outside. For example, the communication device 120 communicates with each logistics robot 10 through a wireless communication network such as 4G, 5G, and the like. The communication device 120 may be connected to a wireless LAN. In addition, the communication device 120 communicates with the sensor 5 that recognizes the situation of each floor of the building 3. Moreover, the communication device 120 may communicate with a user terminal (e.g., PC, tablet, smartphone).

The information processing device 130 includes one or more processors 140 (hereinafter, simply referred to as a "processor 140") and one or more memory devices 150 (hereinafter, simply referred to as a "memory devices 150"). The processor 140 executes a variety of information processing. For example, the processor 140 includes a CPU. The memory device 150 stores a variety of information that is necessary for the processing by the processor 140. Examples of the memory device 150 include a volatile memory, a non-volatile memory, an HDD, an SSD, and the like. The function of the information processing device 130 is implemented by the processor 140 executing a computer program. The computer program is stored in the memory device 150. The computer program may be recorded on a non-transitory computer-readable recording medium. The computer program may be provided via a network.

Moreover, the information processing device 130 can access the database 160. The database 160 is implemented by a predetermined memory device. The database 160 may be included in the memory device 150. The database 160 stores a variety of information necessary for providing the logistics service. The information processing device 130 reads necessary information from the database 160 and stores the information in the memory device 150.

4-2. Example of Variety of Information

Figure 15:
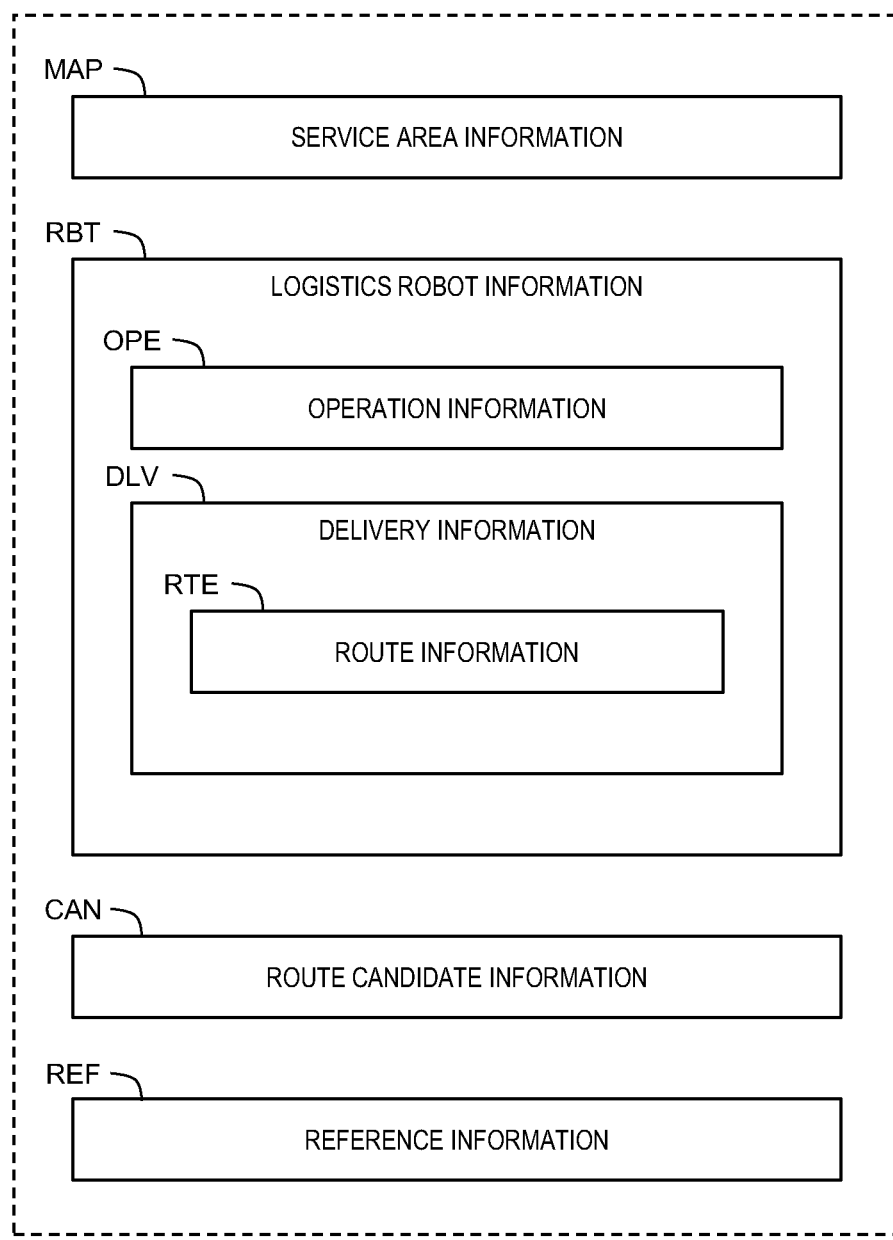
FIG. 15 is a block diagram showing an example of a variety of information in a management system according to an embodiment of the present disclosure.

FIG. 15 is a block diagram showing an example of a variety of information in the management system 100. The variety of information is stored in the memory device 150 and the database 160.

The service area information MAP indicates the configuration of the service area 2 (see FIG. 1) in which the logistics service is provided. For example, the service area information MAP includes a three-dimensional road map, a building layout, a floor configuration in a building, a room layout of each floor, an elevator layout of a building, and the like. The service area information MAP is created in advance. The service area information MAP may be updated at regular intervals.

The logistics robot information RBT is information regarding the logistics robot 10 and is generated for each logistics robot 10. For example, the logistics robot information RBT includes the operation information OPE and the delivery information DLV.

The operation information OPE indicates the position and the state of the logistics robot 10. The processor 140 communicates with each logistics robot 10 via the communication device 120 and periodically acquires the operation information OPE from each logistics robot 10.

The delivery information DLV is information regarding the package delivery. For example, the delivery information DLV includes the package information indicating the delivery destination of each package. Furthermore, the delivery information DLV includes the route information RTE indicating the delivery route along which the logistics robot 10 travels.

The logistics robot information RBT may further include performance information indicating performance of the logistics robot 10. For example, the performance information includes a size, a package storage capacity, a maximum loading weight, a battery capacity, a maximum travel range, a maximum travel speed, and the like of the logistics robot 10. The performance information is generated in advance.

The route candidate information CAN indicates the plurality of delivery route candidates from the position of the logistics robot 10 to the delivery destination of the package.

The reference information REF is information used for selecting the delivery route from the plurality of delivery route candidates indicated by the route candidate information CAN. Examples of the reference information REF include those described in the above Section 2. The route situation information RST is acquired based on information transmitted from the sensors 5 installed in the service area 2. The time-of-day information HRS is acquired from the system clock. The weather condition information CON is acquired from the weather information service system. The delivery history information HST is acquired from the database 160.

4-3. Delivery Process

The processor 140 receives a delivery request from a user of the logistics service. More specifically, the processor 140 receives the delivery request from the user terminal via the communication device 120. The delivery request includes a requested delivery position, a requested delivery date, a requested delivery time, and the like.

In response to the delivery request, the processor 140 assigns a logistics robot 10 that performs the requested delivery. More specifically, based on the service area information MAP, the operation information OPE, and the performance information, the processor 140 selects a logistics robot 10 that is able to arrive at the requested delivery position by the requested delivery time of the requested delivery date. Furthermore, based on the service area information MAP and the requested delivery position (i.e., the delivery destination), the processor 140 determines an appropriate delivery route and generates the route information RTE (delivery route determination process).

More specifically, based on the delivery destination of the package and the service area information MAP, the processor 140 extracts a plurality of delivery route candidates and generates the route candidate information CAN. Furthermore, based on the reference information REF, the processor 140 selects a delivery route from the plurality of delivery route candidates indicated by the route candidate information CAN (see Section 2 described above). The route information RTE indicates the selected delivery route. The delivery information DLV includes the route information RTE.

As described above, in response to the delivery request from the user, the processor 140 assigns the logistics robot 10 that performs the delivery and generates the delivery information DLV regarding the logistics robot 10. The processor 140 communicates with the logistics robot 10 via the communication device 120, provides the delivery information DLV to the logistics robot 10, and instructs the logistics robot 10 to perform the delivery process in accordance with the delivery information DLV. That is to say, the processor 140 controls the logistics robot 10 by providing the delivery information DLV to the logistics robot 10. The logistics robot 10 performs the autonomous travel control based on the delivery information DLV to deliver the package.

As another example, the processor 140 communicates with the logistics robot 10 via the communication device 120 and provides the route candidate information CAN and the reference information REF to the logistics robot 10. In this case, the logistics robot 10 performs the delivery route determination process based on the route candidate information CAN and the reference information REF.

What is claimed is:

1. A logistics system providing a logistics service utilizing a logistics robot that delivers a package by autonomous traveling,
    the logistics system comprising one or more processors configured to:
        execute a delivery route determination process that determines a delivery route along which the logistics robot delivers the package, and
        execute a logistics robot control process that controls the logistics robot so as to deliver the package along the delivery route, wherein
    when there are a plurality of delivery route candidates from a position of the logistics robot to a delivery destination of the package, the one or more processors are further configured to select, as the delivery route, a delivery route candidate from the plurality of delivery route candidates based on at least a congestion degree of each of the plurality of delivery route candidates, and a time of day, the congestion degree being considered differently in selecting the delivery route based on the time of day, and
    the one or more processors are further configured to:
        select a delivery route candidate with a lowest congestion degree among the plurality of delivery route candidates as the delivery route during a first time of day; and
        select a delivery route candidate with a highest congestion degree among the plurality of delivery route candidates as the delivery route during a second time of day different from the first time of day.

2. The logistics system according to claim 1, wherein the one or more processors are further configured to:
    during the first time of day, apply a first score to a delivery route candidate with a highest congestion degree among the plurality of delivery route candidates, and apply a second score greater than the first score to a delivery route candidate with a lowest congestion degree among the plurality of delivery route candidates,
    during the second time of day different from the first time of day, apply a third score to a delivery route candidate with a lowest congestion degree among the plurality of delivery route candidates, and apply a fourth score greater than the third score to a delivery route candidate with a highest congestion degree among the plurality of delivery route candidates, and
    select a delivery route candidate with a greatest total score from among the plurality of delivery route candidates as the delivery route.

3. The logistics system according to claim 1, wherein the first time of day is a daytime, and the second time of day is a night-time.

4. The logistics system according to claim 1, wherein the plurality of delivery route candidates include a ground route and an underground route, and
    the one or more processors are further configured to:
        during the first time of day, apply a first score to the underground route, and apply a second score greater than the first score to the ground route,
        during the second time of day different from the first time of day, apply a third score to the ground route, and apply a fourth score greater than the third score to the underground route, and
        select a delivery route candidate with a greatest total score from among the plurality of delivery route candidates as the delivery route.

5. The logistics system according to claim 4, wherein the first time of day is a daytime and the second time of day is a night-time, or
    the first time of day is a night-time and the second time of day is a daytime.

6. The logistics system according to claim 4, wherein a distance to the delivery destination along the underground route is longer than a distance to the delivery destination along the ground route.

7. The logistics system according to claim 1, wherein the plurality of delivery route candidates include a ground route and an underground route,
    a weather condition parameter includes at least one of an amount of rainfall, an amount of snowfall, an amount of dust fall, a wind speed, a fog density, and a temperature,
    the one or more processors are further configured to:
        when the weather condition parameter is equal to or greater than a threshold, apply a first score to the ground route, and apply a second score greater than the first score to the underground route, and select a delivery route candidate with a greatest total score from among the plurality of delivery route candidates as the delivery route.

8. The logistics system according to claim 1, wherein the one or more processors are further configured to:
apply a score to a delivery route candidate with a lowest energy consumption of the logistics robot among the plurality of delivery route candidates, and
select a delivery route candidate with a greatest total score among the plurality of delivery route candidates as the delivery route.

9. The logistics system according to claim 1, wherein the plurality of delivery route candidates includes a past delivery route along which the logistics robot has previously traveled, and
the one or more processors are configured to:
apply a score to the past delivery route, and
select a delivery route candidate with a greatest total score among the plurality of delivery route candidates as the delivery route.

10. A logistics robot control method for controlling a logistics robot that delivers two packages by autonomous traveling,
the logistics robot control method comprising, by one or more processors:
determining two delivery routes along which the logistics robot delivers each of the two packages; and
controlling the logistics robot so as to deliver each of the two packages along the two delivery routes, wherein
the determining of each of the two delivery routes comprises, for a plurality of delivery route candidates from a respective position of the logistics robot to a delivery destination of the respective package being delivered, selecting, as the delivery route, a delivery route candidate from the plurality of delivery route candidates based on at least a congestion degree of each of the plurality of delivery route candidates, and a time of day, the congestion degree being considered differently in selecting the delivery route based on the time of day, and
the logistics robot control method further comprises, by the one or more processors:
for a first package of the two packages, selecting a delivery route candidate with a lowest congestion degree among the plurality of delivery route candidates as the respective delivery route for the first package during a first time of day; and
for a second package of the two packages, selecting a delivery route candidate with a highest congestion degree among the plurality of delivery route candidates as the respective delivery route for the second package during a second time of day different from the first time of day.

* * * * *